United States Patent
Kluft

(10) Patent No.: US 7,328,081 B2
(45) Date of Patent: Feb. 5, 2008

(54) MONITORING SYSTEM AND METHOD FOR THE IN-PROCESS MONITORING OF MACHINE-TOOL COMPONENTS

(76) Inventor: Werner Kluft, Ellerstrasse 43, 52078 Aachen (DE)

( * ) Notice: Subject to any disclaimer, the term of this patent is extended or adjusted under 35 U.S.C. 154(b) by 121 days.

(21) Appl. No.: 10/488,973

(22) PCT Filed: Sep. 10, 2002

(86) PCT No.: PCT/EP02/10121

§ 371 (c)(1),
(2), (4) Date: Jul. 19, 2005

(87) PCT Pub. No.: WO03/023327

PCT Pub. Date: Mar. 20, 2003

(65) Prior Publication Data

US 2006/0178771 A1    Aug. 10, 2006

(30) Foreign Application Priority Data

Sep. 10, 2001   (DE) ............................. 101 44 459

(51) Int. Cl.
*G06F 19/00*   (2006.01)
(52) U.S. Cl. .................................................. 700/175
(58) Field of Classification Search ................ 700/174, 700/175, 177, 178
See application file for complete search history.

(56) References Cited

U.S. PATENT DOCUMENTS

| | | | | |
|---|---|---|---|---|
| 5,917,726 A * | 6/1999 | Pryor | .......................... | 700/95 |
| 6,415,191 B1 * | 7/2002 | Pryor | .......................... | 700/95 |
| 6,643,613 B2 * | 11/2003 | McGee et al. | .............. | 702/186 |
| 6,961,626 B1 * | 11/2005 | Paik | .......................... | 700/31 |
| 7,076,695 B2 * | 7/2006 | McGee et al. | ................ | 714/47 |

OTHER PUBLICATIONS

PROMETEC GMBH—"Vibration Monitor VIMO 100".
PROMOTEC GMBH—"Modular Process Monitor System PROMOS".

* cited by examiner

*Primary Examiner*—Leo Picard
*Assistant Examiner*—Chad Rapp
(74) *Attorney, Agent, or Firm*—Diller, Ramik & Wright

(57) ABSTRACT

In a monitoring system for the process-accompanying monitoring of machine tool components, it is provided that the same monitoring system, apart from the detection of at least one of the above mentioned conditions in tools, workpieces or processes, is used in other monitoring stages—which at times when no treatment process occurs (i.e. when no tool, workpiece or process monitoring has to occur) are predetermined by the machine control—to perform a detection, monitoring or well-aimed examination of faulty conditions on components of machine tools, such as e.g. damage or wear on the feed slides, on the tool or workpiece spindles or the imbalance on tool or workpiece spindles or on drilling or milling tools.

53 Claims, 1 Drawing Sheet

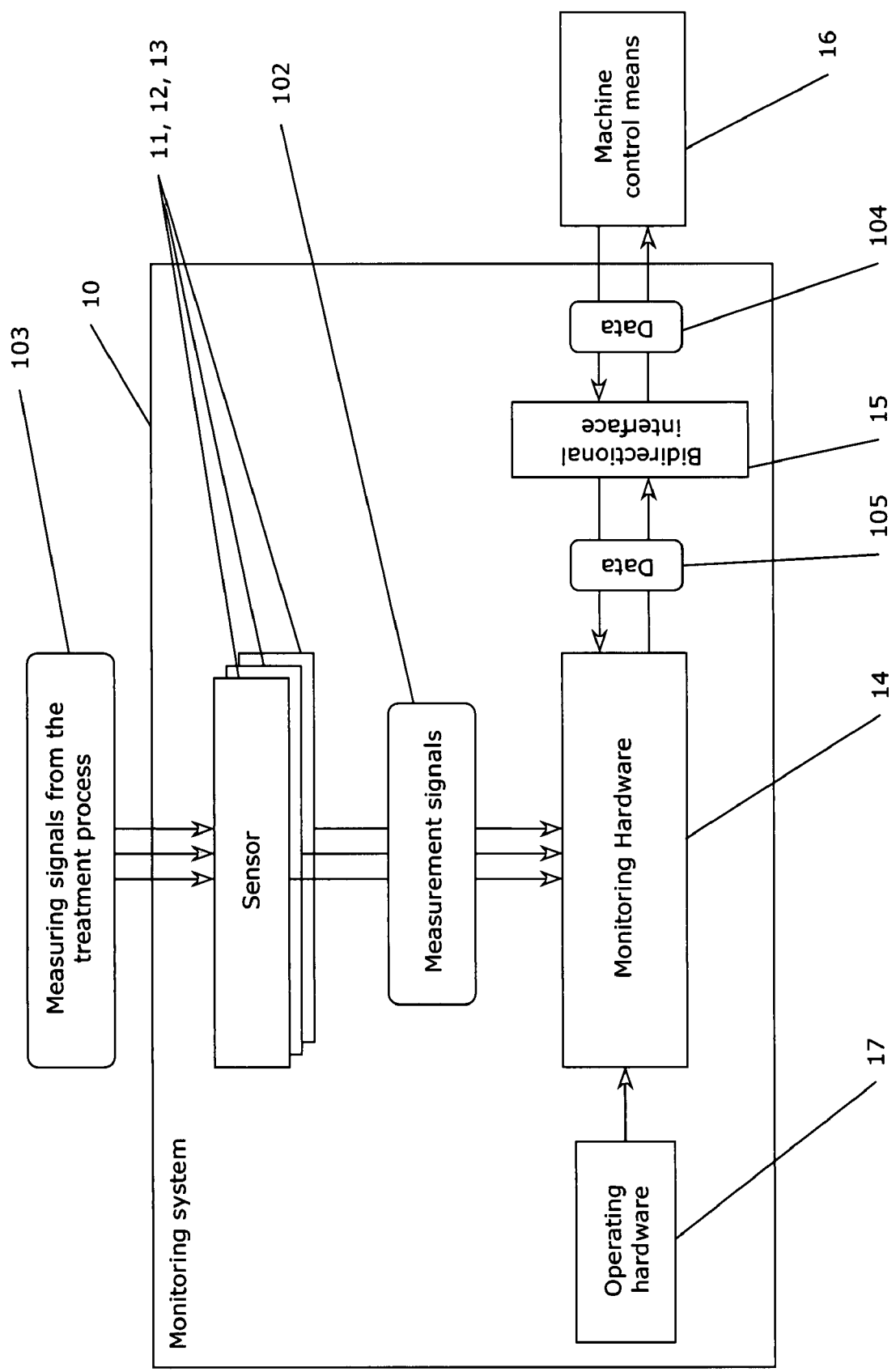

MONITORING SYSTEM AND METHOD FOR THE IN-PROCESS MONITORING OF MACHINE-TOOL COMPONENTS

BACKGROUND OF THE INVENTION

The invention relates to a monitoring system as well as to a method involving a monitoring system for standard use in the process-accompanying monitoring of tools, workpieces or treatment processes in machine tools of the cutting type.

Those components of machine tools which are subject to wear or which are susceptible to damage due to machine collisions, machine overstressing or imbalanced tools or workpieces, are in need of monitoring. Such machine components are substantially those which carry out movements in the machine tools. Therefore, they are substantially restricted to feed slides, tool and workpiece spindles but also include aggregates for the further operation of a machine tool of the cutting type.

Provided that a monitoring system for the process-accompanying monitoring of tools, workpieces or treatment processes has been installed, the method of the invention makes it possible, in performing the monitoring or checking of feed slides and tool and workpiece spindles, to obviate the need for separate monitoring devices, resulting in a considerable potential for cost reduction because the hardware, the software, the operating means and the interface for machine control need not be provided twice.

There exist several known monitoring devices for the monitoring of vibrations on rotating machines and machine components. These are primarily useful for the detection of vibrations and imbalances in engines and transmissions and partially also for the detection of imbalances in machine tool spindles. Some of these devices are also adapted to detect damage on bearings by means of vibration measurements (e.g. the Vibration Monitor VIMO 100 of PROMETEC GmbH, Aachen, cf. enclosure "Vibration Monitor VIMO 100", Prometec company, Aachen, and "Modulares Prozess Monitor System PROMOS", Prometec company, Aachen). The contents of these printed publications are herewith incorporated by reference into the present disclosure.

Further, it is known that machine tools can be provided with vibration detectors arranged on the spindle housings near the bearings to thus detect damage to the bearings, and that the cables of the sensors can be guided to accessible plugs on the front of the machine tool. From time to time, the maintenance personal will use these plugs to analyze the signals for bearing damage by means of analyzing devices. For this purpose, the signals are recorded by analyzing devices and will be analyzed off-line at a later time. An in-process monitoring is not performed here.

Monitoring systems for the process-accompanying monitoring of tools, workpieces or treatment processes in cutting-type machine tools for rotating, drilling or milling serve the purpose of in-process detection of at least one of the conditions of tool breakage, tool breakout, tool wear, contact between tool and workpiece, rattling or machine collision and—particularly in case of tool breakage or machine collision—shall bring the machine drives to a standstill as quickly as possible to preclude consequential damage.

Such in-process monitoring systems are already provided with an electric interface between the monitoring system and the machine control means so as to perform an in-process monitoring of the signal developments of the sensors at monitoring intervals which are predetermined by the machine control means and, in case of a detection of any one of the above mentioned conditions, to bring the machine to a standstill through the same interface. The interfaces between the machine tool control means and the monitoring system have up to now existed substantially in the form of parallel input and output signals for SPC control. Such a parallel interface between the SPC and a tool and process monitoring system can be designed e.g. in accordance with the BAPSI standard which also already allows for the transmission of data words as tool codes or cutting codes from the NC program to the monitoring system. Only recently, manufacturers of control devices increasingly offer field bus interfaces in addition to or instead of these parallel interfaces; the field bus interfaces make it possible to perform a wider exchange of information between the machine control means comprising the stored program control (SPC) or the NC control.

SUMMARY OF THE INVENTION

It is an object of the invention to provide a monitoring system and a method for the process-accompanying monitoring of machine tool components which are adapted, without the need for significant changes in the hardware or software of the monitoring system, to monitor or check components of machine tools.

According to the invention, the object—for fusion a monitoring system for the process-accompanying monitoring of tools, workpieces or treatment processes in cutting-type machine tools for rotating, drilling or milling for at least the conditions of tool breakage, tool breakout, tool wear, tool-workpiece contact and rattling, with a workpiece component monitoring system for the detection, monitoring or checking of faulty conditions in components of machine tools, such as damage or wear on feed slides or on the tool or workpiece spindles, or imbalance of tool or workpiece spindles or of drilling or milling tools—is achieved in that both objects are realized with the same monitoring hardware including corresponding evaluation software and with the same bidirectional interface, preferably a field bus interface, between the monitoring hardware and the machine control means.

Use is made merely of additional sensors on the machine tool components, the feed slides or the tool or workpiece spindles, if such sensors were not required for the original process-accompanying monitoring task to be performed on tools, workpieces or treatment processes.

The systems for the in-process bearing monitoring or vibration or imbalance monitoring are, apart from a tool or process monitoring system, additionally connected to the same field bus. A corresponding monitoring system for the monitoring of spindle or bearing imbalance which includes a serial interface, has been previously unknown.

Presently, monitoring systems for the process-accompanying monitoring of tools, workpieces or treatment processes in cutting-type machine tools for rotating, drilling or milling are provided, in the sense of standard features, with all kinds of monitoring thresholds and monitoring and evaluation strategies of any known and desired type, such as statistical thresholds, dynamic thresholds, thresholds of signal pattern curves, operating value thresholds etc., just as these are also required for the monitoring of faulty conditions on components of machine tools.

The invention solves the problem residing in when and how the machine control means, forming the controlling component for the monitoring stages for the detection of faulty conditions of components of machine tools, has to act, and whether or how it will move or shift or rotate the feed slides or the tool or workpiece spindle, possibly for generating corresponding signals at the sensors of the machine tool component.

The invention further provides a process-accompanying monitoring system for the monitoring of tools, workpieces or treatment processes in cutting-type machine tools for rotating, drilling or milling, can also be used for the detection, monitoring or well-aimed examination of faulty conditions in components in machine tools.

Additional sensors can be provided on the components of machine tools to which the monitoring system can be automatically switched in dependence on the monitoring stage selected by the control.

BRIEF DESCRIPTION OF THE DRAWING

The single FIGURE of drawing illustrates the monitoring system of the present invention.

DETAILED DESCRIPTION OF THE INVENTION

A monitoring system 10 for the process-accompanying monitoring of tools, workpieces or treatment processes in machine tools of the cutting type for rotating, drilling or milling, with the purpose of detecting at least one of the conditions of tool breakage, tool breakout, tool wear, contact between tool and workpiece with or without workpiece gauging, machine collision or process abnormities such as rattling, or tool-, workpiece- or cut-specific overload or underload, is illustrated in the single FIGURE of drawing.

The monitoring system 10 comprises at least
  one or a plurality of sensors 11, 12, 13 for the detection of measurement signals 103 from the treatment process, which are representative of at least a direction of force, a resultant force, a pressure, a moment of rotation, an engine performance, an engine current, a vibration, an acceleration, a structure-born sound or a change of distance between two machine components,
  monitoring hardware with software, generally designated with numeral 14, for the storing and comparing of monitoring data 104, 105 in tool- or cut-specific monitoring stages which are preset by the machine control means 16 through the NC or/and SPC program via an interface 15 and in which measurement signals 102 or measurement signal curves of at least one sensor 11, 12, 13 are compared with stored monitoring thresholds by means of monitoring and evaluation strategies of a known and desired type such as static thresholds, dynamic thresholds, thresholds of signal pattern curves, operating value thresholds, etc. with the purpose of providing, in case of measurement signals violating the monitoring thresholds, a corresponding message to the machine control means to thus initiate a corresponding reaction of the machine,
  a bidirectional interface 15, preferably a field bus interface between the monitoring hardware 14 and the machine control means 16, comprising the SPC or/and the NC control means, which performs a data exchange 104, 105 between the machine and the monitoring system 14 and which particularly is suited to transmit the tool- or cut-specific monitoring stages in the form of data words as distinct numbers or instructions (e.g. as tool codes, tool correction or position numbers, cutting code, H and M instructions), from the NC or SPC program to the monitoring system for dividing the monitoring into a plurality of monitoring stages,
  as well as, possibly optionally, operating hardware 17 for operating and/or parametrizing the monitoring system and/or for visualizing the measurement signals, whereby
  the same monitoring system 10, apart from the detection of at least one of the above mentioned conditions in tools, workpieces or processes, is used in other monitoring stages, which at times when no treatment process occurs (i.e. when no tool, workpiece or process monitoring has to occur) are predetermined by the machine control, to perform a detection, monitoring or well-aimed examination of faulty conditions on components of machine tools, such as e.g. damage or wear on the feed slides, on the tool or workpiece spindles or the imbalance on tool or workpiece spindles or on drilling or milling tools.

Further according to the invention the monitoring system 10 can comprise, for each monitoring task to be performed on components of machine tools, one or a plurality of additional sensors suited to this task which automatically switch the monitoring system 10 when the corresponding monitoring stage for the monitoring task to be performed on components of machine tools is called up by the machine control 16.

In the monitoring system 10 according to the invention for the monitoring of damage or wear on feed slides, said feed slides can be provided with force sensors for detecting the feed force in the slide moving direction on one of the feed spindle bearing blocks, or are provided with current or performance sensors on the feed spindle engines, or, by reading the measurement values of the existing current sensors on the feed drive means from the machine control means 16, via the bidirectional interface 15, which is preferably designed as a field bus interface, or, for a possible monitoring of noises or vibrations on feed slides, these are provided with one or a plurality of sensors for structure-borne noise and/or vibration sensors arranged on the slides, the moving tracks or/and the spindle bearing blocks.

According to the invention in a method for the process-accompanying monitoring of machine tool components by use of the above described monitoring system 10 the machine control 16, during the period in which it sets the monitoring system 10 to enter the monitoring state for the monitoring of feed slides, will also move the one or the plurality of feed slides across the moving regions to be monitored, preferably across the complete moving regions without performing a treatment process at this time, and the machine control 16 can carry out these movements through an NC subprogram portion which is called up together with the data word for the monitoring stage.

Further according to the invention in said method the machine control 16 can perform the monitoring stage for the monitoring of feed slides when no workpiece is arranged in the machine so that the complete moving regions can be moved or reciprocated without a danger of collision and without a treatment process.

According to the invention in said method particularly in the mass production of workpieces, the machine control 16, for the monitoring stage for the monitoring of feed slides, can cause its feed slides to perform the normal NC program for treatment of this workpiece but will not insert a workpiece into the machine for this purpose and in this case, instead of the monitoring stages for the monitoring of tools, workpieces or treatment processes, will transmit the monitoring stage for the monitoring of feed slides to the monitoring system.

Further according to the invention in said method during the call-up of the monitoring stage, the movement of the feed slide can always be identical and the monitoring cycle is repeatedly initiated by the machine control at regular time intervals and with identical operating conditions.

In said method the monitoring stage for the well-aimed monitoring of feed slides can be preset by the machine control virtually for an unlimited number of times during the lifespan of the machine tool.

Further the distance in time between respectively two identical monitoring stages for the well-aimed monitoring of feed slides can be preset by the machine control in accordance to the time when a just about perceptible wear-induced change on the moving tracks would be expected.

Further according to the invention in said method in new or unobjectionable, wear-free feed slides, a teach-in monitoring stage can be performed in which the measurement signals 102 or measurement signal curves of the sensors 11, 12, 13 are stored in the monitoring system 10 and, in relation thereto, the switching thresholds or switching threshold curves for the maximum allowable deviations of the sensor signals for the future monitoring stages are determined up to the end of the lifespan of the feed slides of the machine tool.

In said method the measurement signals 102 or measurement signal curves of the sensors 11, 12, 13 from the sequential identical monitoring stages for the monitoring of the feed slides can be stored in the monitoring system 10 and be read out at all times.

Further according to the invention in said method after machine collision or tool breakage, which the machine control can detect as a matter of a standard feature and which it will communicate to the machine control, the machine control 16, after elimination of the collision or breakage situation, can first perform, at the start of the regular treatment in automatic operation, a—relatively to the otherwise common chronological order—unscheduled monitoring stage for the well-aimed monitoring of the feed slides, and the monitoring system 10 can in this case separately store the measurement signals or measurement signal curves of the sensors in order to document possible damage caused by the collision or the tool breakage on the feed slides.

According to the invention in a second method for the process-accompanying monitoring of machine tool components by use of the above described monitoring system 10, for the monitoring of damage or wear on tool or workpiece spindles, primarily on their bearings, as well as for the examination of inadmissible imbalance on tool or workpiece spindles, said tool or workpiece spindles are provided with sensors for structure-borne sound provided for the detection of the running noise, or with vibration sensors for the detection of spindle vibrations, or with distance sensors for the detection of displacements between two spindle components, preferably between rotor and stator relative to each other, or with temperature sensors for the detection of power-loss-induced increases in temperature, which are each arranged in the immediate region of the bearings, or with current or performance sensors on the tool or workpiece engine, further, by reading out the measurement values of the existing current sensors on the spindle drive means from the machine control 16, via the bidirectional interface, which is preferably provided as a field bus interface, for the detection of power-loss-induced increases in current or performance.

According to the invention in said second method the machine control 16 during the time in which it sets the monitoring system 10 to the monitoring stage for the monitoring of tool or workpiece spindles, can control also the spindles into the rotational speed ranges to be monitored, and preferably can increase and decrease their rotation through their whole rotational speed range without performing a treatment process at this time, and can perform the controlling of the spindles through an NC subprogram portion which is called up together with the data word for the monitoring stage.

Further according to the invention in said second method the machine control 16 can perform the monitoring stage for the monitoring of tool spindles when no tool is arranged in the machine so that the measurement signals cannot be adulterated by the tool.

In said second method the machine control means 16 can perform the monitoring stage for the monitoring of workpiece spindles when no tool is arranged in the machine and the workpiece chuck is positioned identically so that the measurement signals cannot be adulterated by the workpiece or the workpiece chuck.

According to the invention in said second method during the calling-up of the respective monitoring stages for the monitoring of the tool or workpiece spindles, the respective developments of the rotational speeds inclusive of the acceleration or deceleration phases can be always identical, and the respective monitoring cycles for the corresponding tool or workpiece spindles can be repeatedly initiated by the machine control 16 with identical operating conditions of the machine tool.

In said second method the monitoring stages for the well-aimed monitoring of tool or workpiece spindles can be preset by the machine control virtually for an unlimited number of times during the lifespan of a machine tool.

Further the distance in time between respectively two identical monitoring stages for the well-aimed monitoring of feed slides can be preset by the machine control in accordance to the time when a just about perceptible wear-induced change on the moving tracks would be expected.

According to the invention in said second method in new or unobjectionable, wear-free tool or workpiece spindles, respectively one teach-in monitoring stage can be performed in which the measurement signals 102 or measurement signal curves of the sensors 11, 12, 13 are stored in the monitoring system 10 and, in relation thereto, the switching thresholds or switching threshold curves for the maximum allowable deviations of the sensor signals for the future monitoring stages can be determined up to the end of the lifespan of the tool or workpiece spindles in the machine tool.

Further in said second method the measurement signals 102 or measurement signal curves of the sensors 11, 12, 13 from the sequential identical monitoring stages for the monitoring of the tool or workpiece spindles, can be stored in the monitoring system 10 and be read out at all times.

According to the invention in said second method after machine collision or tool breakage, which the machine control 16 can detect as a matter of a standard feature and which it communicates to the machine control 16, the machine control 16, after elimination of the collision or breakage situation, can first perform, at the start of the regular treatment in automatic operation, a—relatively to the otherwise common chronological order—unscheduled monitoring stage for the well-aimed monitoring of the tool or workpiece spindles, and the monitoring system 10 can in this case separately store the measurement signals 102 or measurement signal curves of the sensors 11, 12, 13 in order to document possible damage caused by the collision or the tool breakage on the tool or workpiece spindles.

In said second method particularly in the mass production of workpieces, the machine control 16, for checking the tool or workpiece spindles for damage or wear, can perform the normal NC program for treatment of this workpiece but will transmit to the monitoring system 10, in addition to the normal monitoring cycles for the monitoring of tools, workpieces or treatment processes, a specific monitoring stage for checking the tool or workpiece spindles for damage or wear during the respective acceleration of the spindle to the respective desired rotational speed prior to the treatment process involving the respective tool or workpiece, and in the process will check the measurement signals in the acceleration phase of the spindle preferably by expansion of signal pattern curves from a corresponding teach-in monitoring stage.

Further the corresponding checking can be performed during the deceleration of the spindle.

According to the invention in said second method the corresponding checking of the tool or workpiece spindles for damage or wear can be performed solely by checking the measurement signal values within a short time slot during the acceleration or deceleration of the spindle and, for this purpose, a correspondingly short monitoring stage can be transmitted to the monitoring device.

According to the invention in a third method for the process-accompanying monitoring of machine tool components by use of the above described monitoring system according for the monitoring of inadmissible imbalance on drilling or workpiece spindles or on drilling or milling tools, the tool or workpiece spindles are provided, preferably on the spindle housing near the bearings, with vibration sensors for the detection of spindle or workpiece vibrations, or with distance sensors for the detection of displacements between two spindle components, preferably between rotor and stator relative to each other, further with sensors for generating one pulse per spindle revolution which makes it possible for the monitoring system 10 to read only the maximum values of the vibration signal within each spindle revolution for purposes of comparison to the threshold values, or to eliminate disturbing vibrations from the vibration or distance signals by means of a pulse- or rotational-speed-dependent notch filter.

According to the invention in said third method the machine control 16 during the time in which it sets the monitoring system 10 to the monitoring stage for the checking of tool or workpiece spindles for imbalance, can control also the spindles into the rotational speed ranges to be monitored, while these do not carry tools or workpieces at this time, and can perform the controlling of the spindles through an NC subprogram portion which is called up together with the data word for the monitoring stage.

Further according to the invention in said third method, during the calling-up of the respective monitoring stages for the checking of tool or workpiece spindles for imbalance, the respective rotational speeds can be always identical, and the respective monitoring cycles for the corresponding tool or workpiece spindles can be repeatedly initiated by the machine control 16 at regular time intervals.

Further in said third method the monitoring stages for the well-aimed checking of tool or workpiece spindles for imbalance can be preset by the machine control 16 virtually for an unlimited number of times during the lifespan of a machine tool.

Further the distance in time between respectively two identical monitoring stages for the well-aimed checking of tool or workpiece spindles for imbalance can be preset by the machine control 16 in accordance to the time when a just about perceptible imbalance-induced change on the tool or workpiece spindles would be expected.

According to the invention in said third method in new or unobjectionably balanced tool or workpiece spindles, respectively one teach-in monitoring stage can be performed in which the measurement signals 102 of the sensors 11, 12, 13 are stored in the monitoring system 10 and, in relation thereto, the switching thresholds for the maximum allowable deviations of the sensor signals for the future monitoring stages are determined up to the point when an inadmissible imbalance of the tool or workpiece spindles is reached.

Further according to the invention in said third method the measurement signals of the sensors from the sequential identical monitoring stages for the monitoring of imbalance of the tool or workpiece spindles can be stored in the monitoring system 10 and be read out at all times.

Further in said third method, particularly in the mass production of workpieces, the machine control 16, in order to check drilling and milling tools for inadmissible imbalance, can be perform the normal NC program for treatment of this workpiece but will additionally transmit to the monitoring system 10 respectively one workpiece-specific monitoring stage for checking the respective drilling and milling tools for inadmissible imbalance during the respective acceleration of the tool spindle with the respective tool to the respective desired rotational speed.

Further the corresponding checking of the workpiece spindles for inadmissible imbalance of the respective drilling and milling tools can be performed only by checking the measurement signal values within a short time slot during the acceleration of the spindle and, for this purpose, a correspondingly short monitoring stage can be transmitted from the machine control 16 to the monitoring device and this monitoring stage can be preferably transmitted at about 50% of the desired rotational number so that a further acceleration in a condition of undesired imbalance of the workpiece spindles with the respective drilling or milling tool can be avoided by direct switch-off of the spindle.

Further in new or unobjectionably balanced tool spindles and respective dummy tools with defined, just about tolerable imbalances instead of the original tools in the tool spindles, there can be performed respectively once a teach-in monitoring stage for all tool types wherein the measurement signals 102 of the sensors 11, 12, 13 are stored in the monitoring system 10 and, in correspondence thereto, the switching thresholds for the maximum allowable deviations of the sensor signals for the future monitoring stages are determined up to the point when an inadmissible imbalance of the drilling or milling is reached.

According to the invention the above described monitoring system, for the monitoring of damage or wear on other engine-driven devices of the machine, such as an hydraulic aggregate, a cooling lubricant pump, drive means for the protective door etc., to be referred to as aggregates hereunder, said engine-driven devices of the machine can be provided with current or performance sensors on the drive engines, or, for the monitoring of noises or vibrations on the aggregates, can be provided with one or a plurality of sensors for structure-borne noise and/or with vibration sensors.

According to the invention in a fourth method for process-accompanying monitoring of machine tool components by use of the latter monitoring system 10 the machine control 16 during the time in which it sets the monitoring system to the monitoring stage for the checking of aggregates, can operate or reciprocate also the corresponding aggregates through the performance ranges to be monitored, preferably through the complete performance ranges, while not carrying out a treatment process at this time, and can perform these movements through an NC subprogram portion which is called up together with the data word for the monitoring stage.

According to the invention in said fourth method the machine control can perform the monitoring stage for the monitoring of aggregates when no workpiece is arranged in the machine so that the aggregates can be operated or reciprocated throughout their performance range without a danger of collision and without a treatment process.

Further in said fourth method the monitoring stage for the well-aimed monitoring of aggregates can be preset by the machine control 16 virtually for an unlimited number of times during the lifespan of a machine tool.

Further the distance in time between respectively two identical monitoring stages for the well-aimed checking of aggregates can be preset by the machine control 16 in accordance to the time when a just about perceptible wear-induced change on the aggregates would be expected.

According to the invention in said fourth method in new or unobjectionable, wear-free aggregates, a teach-in monitoring stage can be performed in which the measurement signals 102 or measurement signal curves of the sensors 11, 12, 13 are stored in the monitoring system 10 and, in relation thereto, the switching thresholds or switching threshold curves for the maximum allowable deviations of the sensor signals for the future monitoring stages are determined up to the end of the lifespan of the aggregates.

Further in said fourth method the measurement signals or measurement signal curves of the sensors from the sequential identical monitoring stages for the monitoring of the aggregates can be stored in the monitoring system 10 and be read out at all times.

Although a preferred embodiment of the invention has been specifically described herein, it is to be understood that minor variations may be made in the invention without departing from the spirit and scope thereof, as defined by the appended claims.

What is claimed is:

1. A monitoring system for the process-accompanying monitoring of tools, workpieces or treatment processes in machine tools of the cutting type for rotating, drilling or milling, with the purpose of detecting at least one of the conditions of tool breakage, tool breakout, tool wear, contact between tool and workpiece with or without workpiece gauging, machine collision or process abnormalities such as rattling, or tool-, workpiece- or cut-specific overload or underload, comprising at least one or a plurality of sensors for the detection of measuring signals from the treatment process, which are representative of at least a direction of force, a resultant force, a pressure, a moment of rotation, an engine performance, an engine current, a vibration, an acceleration, a structure-born sound or a change of distance between two machine components, monitoring hardware with software for the storing and comparing of monitoring data in tool- or cut-specific monitoring stages which are preset by the machine control means through the NC or/and SPC program via an interface and in which measurement signals or measurement signal curves of at least one sensor are compared with stored monitoring thresholds by means of monitoring and evaluation strategies of a known and desired type such as static thresholds, dynamic thresholds, thresholds of signal pattern curves, operating value thresholds, etc. with the purpose of providing, in case of measurement signals violating the monitoring thresholds, a corresponding message to the machine control means to thus initiate a corresponding reaction of the machine, a bidirectional interface, preferably a field bus interface between the monitoring hardware and the machine control means, comprising the SPC or/and the NC control means, which performs a data exchange between the machine and the monitoring system and which particularly is suited to transmit the tool- or cut-specific monitoring stages in the form of data words as distinct numbers or instructions (e.g. as tool codes, tool correction or position numbers, cutting code, H and M instructions), from the NC or SPC program to the monitoring system for dividing the monitoring into a plurality of monitoring stages, as well as, possibly optionally, operating hardware for operating and/or parametrizing the monitoring system and/or for visualizing the measurement signals, characterized in that the same monitoring system, apart from the detection of at least one of the above mentioned conditions in tools, workpieces or processes, is used in other monitoring stages, which at times when no treatment process occurs (i.e. when no tool, workpiece or process monitoring has to occur) are predetermined by the machine control, to perform a detection, monitoring or well-aimed examination of faulty conditions on components of machine tools, such as e.g. damage or wear on the feed slides, on the tool or workpiece spindles or the imbalance on tool or workpiece spindles or on drilling or milling tools.

2. The monitoring system according to claim 1, characterized in that the monitoring system can comprise, for each monitoring task to be performed on components of machine tools, one or a plurality of additional sensors suited to this task which automatically switch the monitoring system when the corresponding monitoring stage for the monitoring task to be performed on components of machine tools is called up by the machine control.

3. The monitoring system according to claim 2, characterized in that, for the monitoring of damage or wear on feed slides, these are provided with force sensors for detecting the feed force in the slide moving direction on one of the feed spindle bearing blocks, or are provided with current or performance sensors on the feed spindle engines, or, by reading the measurement values of the existing current sensors on the feed drive means from the machine control means, via the bidirectional interface, which is preferably designed as a field bus interface, or, for a possible monitoring of noises or vibrations on feed slides, these are provided with one or a plurality of sensors for structure-borne noise and/or vibration sensors arranged on the slides, the moving tracks or/and the spindle bearing blocks.

4. A method for the process-accompanying monitoring of machine tool components by use of a monitoring system according to claim 2, characterized in that, for the monitoring of damage or wear on tool or workpiece spindles, primarily on their bearings, as well as for the examination of inadmissible imbalance on tool or workpiece spindles, these are provided with sensors for structure-borne sound provided for the detection of the running noise, or with vibration sensors for the detection of spindle vibrations, or with distance sensors for the detection of displacements between two spindle components, preferably between rotor and stator relative to each other, or with temperature sensors for the detection of power-loss-induced increases in temperature, which are each arranged in the immediate region of the bearings, or with current or performance sensors on the tool or workpiece engine, further, by reading out the measurement values of the existing current sensors on the spindle drive means from the machine control, via the bidirectional interface, which is preferably provided as a field bus interface, for the detection of power-loss-induced increases in current or performance.

5. A method for the process-accompanying monitoring of machine tool components by use of a monitoring system according to claim 2, characterized in that, for the monitoring of inadmissible imbalance on drilling or workpiece spindles or on drilling or milling tools, the tool or workpiece spindles are provided, preferably on the spindle housing near the bearings, with vibration sensors for the detection of spindle or workpiece vibrations, or with distance sensors for the detection of displacements between two spindle components, preferably between rotor and stator relative to each other, further with sensors for generating one pulse per spindle revolution which makes it possible for the monitoring system to read only the maximum values of the vibration signal within each spindle revolution for purposes of comparison to the threshold values, or to eliminate disturbing vibrations from the vibration or distance signals by means of a pulse- or rotational-speed-dependent notch filter.

6. The monitoring system according to claim 2, characterized in that, for the monitoring of damage or wear on other engine-driven devices of the machine, such as an hydraulic aggregate, a cooling lubricant pump, drive means for the protective door etc., to be referred to as aggregates hereunder, these are provided with current or performance sensors on the drive engines, or, for the monitoring of noises or vibrations on the aggregates, these are provided with one or a plurality of sensors for structure-borne noise and/or with vibration sensors.

7. The monitoring system according to claim 1, characterized in that, for the monitoring of damage or wear on feed slides, these are provided with force sensors for detecting the feed force in the slide moving direction on one of the feed spindle bearing blocks, or are provided with current or performance sensors on the feed spindle engines, or, by reading the measurement values of the existing current sensors on the feed drive means from the machine control means, via the bidirectional interface, which is preferably designed as a field bus interface, or, for a possible monitoring of noises or vibrations on feed slides, these are provided with one or a plurality of sensors for structure-borne noise and/or vibration sensors arranged on the slides, the moving tracks or/and the spindle bearing blocks.

8. A method for the process-accompanying monitoring of machine tool components by use of a monitoring system according claim 1, characterized in that the machine control, during the period in which it sets the monitoring system to enter the monitoring state for the monitoring of feed slides, will also move the one or the plurality of feed slides across the moving regions to be monitored, preferably across the complete moving regions without performing a treatment process at this time, and that the machine control can carry out these movements through an NC subprogram portion which is called up together with the data word for the monitoring stage.

9. The method according to claim 8, characterized in that the machine control performs the monitoring stage for the monitoring of feed slides when no workpiece is arranged in the machine so that the complete moving regions can be moved or reciprocated without a danger of collision and without a treatment process.

10. The method according to claim 8, characterized in that, particularly in the mass production of workpieces, the machine control, for the monitoring stage for the monitoring of feed slides, will cause its feed slides to perform the normal NC program for treatment of this workpiece but will not insert a workpiece into the machine for this purpose and in this case, instead of the monitoring stages for the monitoring of tools, workpieces or treatment processes, will transmit the monitoring stage for the monitoring of feed slides to the monitoring system.

11. The method according to claim 8, characterized in that, during the call-up of the monitoring stage, the movement of the feed slide is always identical and the monitoring cycle is repeatedly initiated by the machine control at regular time intervals and with identical operating conditions.

12. The method according to claim 8, characterized in that the monitoring stage for the well-aimed monitoring of feed slides can be preset by the machine control virtually for an unlimited number of times during the lifespan of the machine tool.

13. The method according to claim 12, characterized in that the distance in time between respectively two identical monitoring stages for the well-aimed monitoring of feed slides is preset by the machine control in accordance to the time when a just about perceptible wear-induced change on the moving tracks would be expected.

14. The method according to claim 8, characterized in that in new or unobjectionable, wear-free feed slides, a teach-in monitoring stage is performed in which the measurement signals or measurement signal curves of the sensors are stored in the monitoring system and, in relation thereto, the switching thresholds or switching threshold curves for the maximum allowable deviations of the sensor signals for the future monitoring stages are determined up to the end of the lifespan of the feed slides of the machine tool.

15. The method according to claim 8, characterized in that the measurement signals or measurement signal curves of the sensors from the sequential identical monitoring stages for the monitoring of the feed slides can be stored in the monitoring system and be read out at all times.

16. The method according to claim 8, characterized in that, after machine collision or tool breakage, which the machine control can detect as a matter of a standard feature and which it will communicate to the machine control, the machine control, after elimination of the collision or breakage situation, will first perform, at the start of the regular treatment in automatic operation, a—relatively to the otherwise common chronological order—unscheduled monitoring stage for the well-aimed monitoring of the feed slides, and that the monitoring system will in this case separately store the measurement signals or measurement signal curves of the sensors in order to document possible damage caused by the collision or the tool breakage on the feed slides.

17. A method for the process-accompanying monitoring of machine tool components by use of a monitoring system according to claim 1, characterized in that, for the monitoring of damage or wear on tool or workpiece spindles, primarily on their bearings, as well as for the examination of inadmissible imbalance on tool or workpiece spindles, these are provided with sensors for structure-borne sound provided for the detection of the running noise, or with vibration sensors for the detection of spindle vibrations, or with distance sensors for the detection of displacements between two spindle components, preferably between rotor and stator relative to each other, or with temperature sensors for the detection of power-loss-induced increases in temperature, which are each arranged in the immediate region of the bearings, or with current or performance sensors on the tool or workpiece engine, further, by reading out the measurement values of the existing current sensors on the spindle drive means from the machine control, via the bidirectional interface, which is preferably provided as a field bus interface, for the detection of power-loss-induced increases in current or performance.

18. The method according to claim 17, characterized in that the machine control during the time in which it sets the monitoring system to the monitoring stage for the monitoring of tool or workpiece spindles, will control also the spindles into the rotational speed ranges to be monitored, and preferably will increase and decrease their rotation through their whole rotational speed range without performing a treatment process at this time, and can perform the controlling of the spindles through an NC subprogram portion which is called up together with the data word for the monitoring stage.

19. The method according to claim 18, characterized in that the machine control performs the monitoring stage for the monitoring of tool spindles when no tool is arranged in the machine so that the measurement signals cannot be adulterated by the tool.

20. The method according to claim 18, characterized in that the machine control means performs the monitoring stage for the monitoring of workpiece spindles when no tool is arranged in the machine and the workpiece chuck is positioned identically so that the measurement signals cannot be adulterated by the workpiece or the workpiece chuck.

21. The method according to claim 18, characterized in that, particularly in the mass production of workpieces, the machine control, for checking the tool or workpiece spindles for damage or wear, will perform the normal NC program for treatment of this workpiece but will transmit to the monitoring system, in addition to the normal monitoring cycles for the monitoring of tools, workpieces or treatment processes, a specific monitoring stage for checking the tool or workpiece spindles for damage or wear during the respective acceleration of the spindle to the respective desired rotational speed prior to the treatment process involving the respective tool or workpiece, and in the process will check the measurement signals in the acceleration phase of the spindle preferably by expansion of signal pattern curves from a corresponding teach-in monitoring stage.

22. The method according to claim 17, characterized in that the machine control performs the monitoring stage for the monitoring of tool spindles when no tool is arranged in the machine so that the measurement signals cannot be adulterated by the tool.

23. The method according to claim 17, characterized in that the machine control means performs the monitoring stage for the monitoring of workpiece spindles when no tool is arranged in the machine and the workpiece chuck is positioned identically so that the measurement signals cannot be adulterated by the workpiece or the workpiece chuck.

24. The method according to claim 17, characterized in that, during the calling-up of the respective monitoring stages for the monitoring of the tool or workpiece spindles, the respective developments of the rotational speeds inclusive of the acceleration or deceleration phases are always identical, and that the respective monitoring cycles for the corresponding tool or workpiece spindles are repeatedly initiated by the machine control with identical operating conditions of the machine tool.

25. The method according to any claim 17, characterized in that the monitoring stages for the well-aimed monitoring of tool or workpiece spindles can be preset by the machine control virtually for an unlimited number of times during the lifespan of a machine tool.

26. The method according to claim 25, characterized in that the distance in time between respectively two identical monitoring stages for the well-aimed monitoring of feed slides is preset by the machine control in accordance to the time when a just about perceptible wear-induced change on the moving tracks would be expected.

27. The method according to claim 17, characterized in that in new or unobjectionable, wear-free tool or workpiece spindles, respectively one teach-in monitoring stage is performed in which the measurement signals or measurement signal curves of the sensors are stored in the monitoring system and, in relation thereto, the switching thresholds or switching threshold curves for the maximum allowable deviations of the sensor signals for the future monitoring stages are determined up to the end of the lifespan of the tool or workpiece spindles in the machine tool.

28. The method according to claim 17, characterized in that the measurement signals or measurement signal curves of the sensors from the sequential identical monitoring stages for the monitoring of the tool or workpiece spindles, can be stored in the monitoring system and be read out at all times.

29. The method according to claim 17, characterized in that, after machine collision or tool breakage, which the machine control can detect as a matter of a standard feature and which it communicates to the machine control, the machine control, after elimination of the collision or breakage situation, will first perform, at the start of the regular treatment in automatic operation, a—relatively to the otherwise common chronological order—unscheduled monitoring stage for the well-aimed monitoring of the tool or workpiece spindles, and that the monitoring system will in this case separately store the measurement signals or measurement signal curves of the sensors in order to document possible damage caused by the collision or the tool breakage on the tool or workpiece spindles.

30. The method according to claim 17, characterized in that, particularly in the mass production of workpieces, the machine control, for checking the tool or workpiece spindles for damage or wear, will perform the normal NC program for treatment of this workpiece but will transmit to the monitoring system, in addition to the normal monitoring cycles for the monitoring of tools, workpieces or treatment processes, a specific monitoring stage for checking the tool or workpiece spindles for damage or wear during the respective acceleration of the spindle to the respective desired rotational speed prior to the treatment process involving the respective tool or workpiece, and in the process will check the measurement signals in the acceleration phase of the spindle preferably by expansion of signal pattern curves from a corresponding teach-in monitoring stage.

31. The method according to claim 30, characterized in that the corresponding checking can be performed during the deceleration of the spindle.

32. The method according to claim 31, characterized in that the corresponding checking of the tool or workpiece spindles for damage or wear is performed solely by checking the measurement signal values within a short time slot during the acceleration or deceleration of the spindle and that, for this purpose, a correspondingly short monitoring stage is transmitted to the monitoring device.

33. The method according to claim 30, characterized in that the corresponding checking of the tool or workpiece spindles for damage or wear is performed solely by checking the measurement signal values within a short time slot during the acceleration or deceleration of the spindle and that, for this purpose, a correspondingly short monitoring stage is transmitted to the monitoring device.

34. A method for the process-accompanying monitoring of machine tool components by use of a monitoring system according to claim 1, characterized in that, for the monitoring of inadmissible imbalance on drilling or workpiece spindles or on drilling or milling tools, the tool or workpiece spindles are provided, preferably on the spindle housing near the bearings, with vibration sensors for the detection of spindle or workpiece vibrations, or with distance sensors for the detection of displacements between two spindle components, preferably between rotor and stator relative to each other, further with sensors for generating one pulse per spindle revolution which makes it possible for the monitoring system to read only the maximum values of the vibration signal within each spindle revolution for purposes of comparison to the threshold values, or to eliminate disturbing vibrations from the vibration or distance signals by means of a pulse- or rotational-speed-dependent notch filter.

35. The method according to claim 34, characterized in that the machine control during the time in which it sets the monitoring system to the monitoring stage for the checking of tool or workpiece spindles for imbalance, will control also the spindles into the rotational speed ranges to be monitored, while these do not carry tools or workpieces at this time, and can perform the controlling of the spindles through an NC subprogram portion which is called up together with the data word for the monitoring stage.

36. The method according to claim 35, characterized in that, during the calling-up of the respective monitoring stages for the checking of tool or workpiece spindles for imbalance, the respective rotational speeds are always identical, and that the respective monitoring cycles for the corresponding tool or workpiece spindles can be repeatedly initiated by the machine control at regular time intervals.

37. The method according to claim 35, characterized in that, particularly in the mass production of workpieces, the machine control, in order to check drilling and milling tools for inadmissible imbalance, will perform the normal NC program for treatment of this workpiece but will additionally transmit to the monitoring system respectively one workpiece-specific monitoring stage for checking the respective drilling and milling tools for inadmissible imbalance during the respective acceleration of the tool spindle with the respective tool to the respective desired rotational speed.

38. The method according to claim 34, characterized in that, during the calling-up of the respective monitoring stages for the checking of tool or workpiece spindles for imbalance, the respective rotational speeds are always identical, and that the respective monitoring cycles for the corresponding tool or workpiece spindles can be repeatedly initiated by the machine control at regular time intervals.

39. The method according to claim 34, characterized in that the monitoring stages for the well-aimed checking of tool or workpiece spindles for imbalance can be preset by the machine control virtually for an unlimited number of times during the lifespan of a machine tool.

40. The method according to claim 39, characterized in that the distance in time between respectively two identical monitoring stages for the well-aimed checking of tool or workpiece spindles for imbalance is preset by the machine control in accordance to the time when a just about perceptible imbalance-induced change on the tool or workpiece spindles would be expected.

41. The method according to claim 34, characterized in that in new or unobjectionably balanced tool or workpiece spindles, respectively one teach-in monitoring stage is performed in which the measurement signals of the sensors are stored in the monitoring system and, in relation thereto, the switching thresholds for the maximum allowable deviations of the sensor signals for the future monitoring stages are determined up to the point when an inadmissible imbalance of the tool or workpiece spindles is reached.

42. The method according to claim 34, characterized in that the measurement signals of the sensors from the sequential identical monitoring stages for the monitoring of imbalance of the tool or workpiece spindles can be stored in the monitoring system and be read out at all times.

43. The method according to claim 34, characterized in that, particularly in the mass production of workpieces, the machine control, in order to check drilling and milling tools for inadmissible imbalance, will perform the normal NC program for treatment of this workpiece but will additionally transmit to the monitoring system respectively one workpiece-specific monitoring stage for checking the respective drilling and milling tools for inadmissible imbalance during the respective acceleration of the tool spindle with the respective tool to the respective desired rotational speed.

44. The method according to claim 43, characterized in that the corresponding checking of the workpiece spindles for inadmissible imbalance of the respective drilling and milling tools is performed only by checking the measurement signal values within a short time slot during the acceleration of the spindle and that, for this purpose, a correspondingly short monitoring stage is transmitted from the machine control to the monitoring device and that this monitoring stage is preferably transmitted at about 50% of the desired rotational number so that a further acceleration in a condition of undesired imbalance of the workpiece spindles with the respective drilling or milling tool can be avoided by direct switch-off of the spindle.

45. The method according to claim 44, characterized in that in new or unobjectionably balanced tool spindles and respective dummy tools with defined, just about tolerable imbalances instead of the original tools in the tool spindles, there is performed respectively once a teach-in monitoring stage for all tool types wherein the measurement signals of the sensors are stored in the monitoring system and, in correspondence thereto, the switching thresholds for the maximum allowable deviations of the sensor signals for the future monitoring stages are determined up to the point when an inadmissible imbalance of the drilling or milling is reached.

46. The method according to claim 43, characterized in that in new or unobjectionably balanced tool spindles and respective dummy tools with defined, just about tolerable imbalances instead of the original tools in the tool spindles, there is performed respectively once a teach-in monitoring stage for all tool types wherein the measurement signals of the sensors are stored in the monitoring system and, in correspondence thereto, the switching thresholds for the maximum allowable deviations of the sensor signals for the future monitoring stages are determined up to the point when an inadmissible imbalance of the drilling or milling is reached.

47. The monitoring system according to claim 1, characterized in that, for the monitoring of damage or wear on other engine-driven devices of the machine, such as an hydraulic aggregate, a cooling lubricant pump, drive means for the protective door etc., to be referred to as aggregates hereunder, these are provided with current or performance sensors on the drive engines, or, for the monitoring of noises or vibrations on the aggregates, these are provided with one or a plurality of sensors for structure-borne noise and/or with vibration sensors.

48. A method for process-accompanying monitoring of machine tool components by use of a monitoring system according to claim 47, characterized in that the machine control during the time in which it sets the monitoring system to the monitoring stage for the checking of aggregates, will operate or reciprocate also the corresponding aggregates through the performance ranges to be monitored, preferably through the complete performance ranges, while not carrying out a treatment process at this time, and can perform these movements through an NC subprogram portion which is called up together with the data word for the monitoring stage.

49. The method according to claim 47, characterized in that the machine control performs the monitoring stage for the monitoring of aggregates when no workpiece is arranged in the machine so that the aggregates can be operated or reciprocated throughout their performance range without a danger of collision and without a treatment process.

50. The method according to claim 47, characterized in that the monitoring stage for the well-aimed monitoring of aggregates can be preset by the machine control virtually for an unlimited number of times during the lifespan of a machine tool.

51. The method according to claim 50, characterized in that the distance in time between respectively two identical monitoring stages for the well-aimed checking of aggregates is preset by the machine control in accordance to the time when a just about perceptible wear-induced change on the aggregates would be expected.

52. The method according to claim 47, characterized in that in new or unobjectionable, wear-free aggregates, a teach-in monitoring stage is performed in which the measurement signals or measurement signal curves of the sensors are stored in the monitoring system and, in relation thereto, the switching thresholds or switching threshold curves for the maximum allowable deviations of the sensor signals for the future monitoring stages are determined up to the end of the lifespan of the aggregates.

53. The method according to claim 47, characterized in that the measurement signals or measurement signal curves of the sensors from the sequential identical monitoring stages for the monitoring of the aggregates can be stored in the monitoring system and be read out at all times.

* * * * *